Jan. 13, 1959     J. E. H. WESTBERG     2,868,549

EXPANSIBLE CLAMP ARBORS

Filed March 14, 1956

JOHAN E. H. WESTBERG
INVENTOR

BY Theodore E. Simonton
ATTORNEY

United States Patent Office 2,868,549
Patented Jan. 13, 1959

2,868,549

EXPANSIBLE CLAMP ARBORS

Johan E. H. Westberg, Lidingo, Sweden

Application March 14, 1956, Serial No. 571,557

3 Claims. (Cl. 279—46)

This invention relates to expansible clamp arbors and more particularly to an improved arbor of the type described in my United States Patent No. 2,593,638, issued April 22, 1952.

The principal object of the present invention is to provide an expansible clamp arbor of the foregoing type in which the machine tool spindle-engaging portion of the arbor may be located closer to the work-gripping portion, thereby increasing the work-clamping force of the arbor, without loss of its structural strength.

Other objects and advantages of the present invention will be apparent from the following description taken in conjunction with the accompanying drawings, in which.

Figure 2:
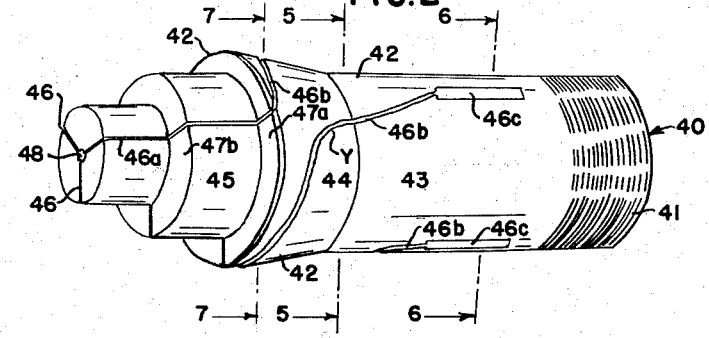
Figure 2 is a perspective view, similar to Figure 1, of an improved arbor of the present invention.
Figure 5:
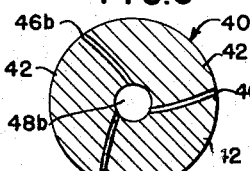
Figure 6:
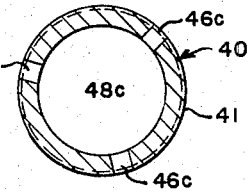
Figure 7:
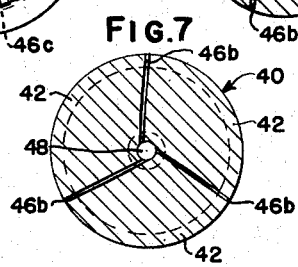

Figures 5, 6 and 7 are sectional views on the lines 5—5, 6—6 and 7—7 of Figure 2, respectively.

Figure 1:
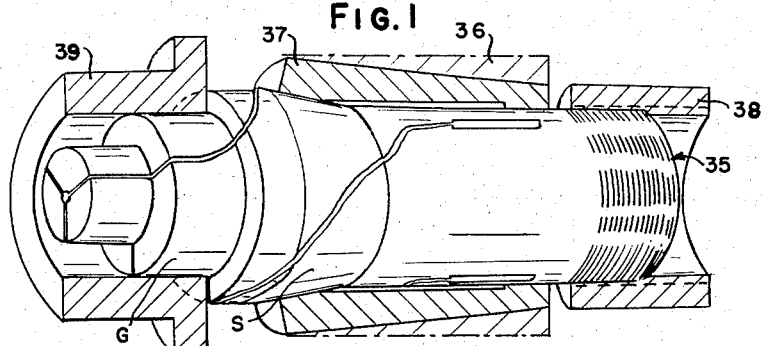
Figure 1 is a perspective view showing the expansible clamp arbor of my prior patent in use, portions of the machine in which it is used and of the work being shown in section.

Referring more particularly to the drawings, Figure 1 shows an expansible clamp arbor 35 as described in my above mentioned Patent 2,593,638, as it is used in a machine tool. The arbor-holding means of the machine tool comprises the hollow taper spindle 36, the spindle sleeve 37 tapered to fit within the spindle 36, and the nut 38. The nut 38 constitutes the work-tightening mechanism of the machine, and the inner end of the arbor 35 is threaded into it. As the nut 38 is turned in the tightening direction, it draws the arbor 35 to the right in Figure 1, thereby causing the spindle-engaging conical portion S of the arbor 35 to engage the mating conical inner surface of the spindle sleeve 37. The sleeve 37, in turn, compresses the spindle-engaging portion S, thereby causing the work-gripping portion G of the arbor to spread and clamp the workpiece 39 from within.

The improved arbor 40 of the present invention is shown in Figures 2-7 and comprises a threaded, hollow, cylindrical, and peripherally continuous end portion 41 and three helically curved jaws or arm portions 42. Each jaw 42 has a resilient connecting portion 43 joined to the end portion 41 of the arbor, a spindle-contacting conical portion 44, and a work-gripping portion 45. The work-gripping portion 45 is preferably stepped as at 45a and 45b (Figure 3) to provide portions for holding work of different inside diameters.

The three jaws 42 are peripherally separated, one from the other, by three narrow slots 46 (Figure 2) extending inward from the outer surface of the jaws to the central axis of the arbor. Each work-gripping portion 45a and 45b of each jaw 42 is sector shaped in cross-section and embraces included angles of approximately 120 degrees, this portion of the jaws being separated by axially extending radial slots 46a, 120 degrees apart about the axis of the arbor. The three jaws 42 continue to be separated at their conical portions 44 and at their resilient connecting portions 43 by the slots 46b which are also substantially radial at any given level and are spaced 120 degrees apart about the axis of the arbor. The slots 46b are continuous with the slots 46a, but, however, twist helically about the arbor, as shown in Figure 2, to give the jaws 42 their helically curved shape so thta each jaw has a surface area A (Figure 3) on its conical portion 44 peripherally offset 180 degrees from a surface area B on its work-gripping portion 45.

Figure 3:
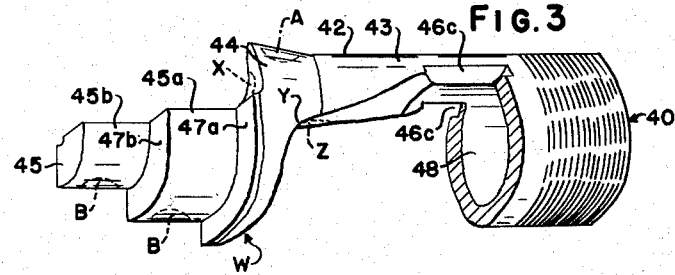
Figure 3 is a perspective view, similar to Figure 2, of a portion of the improved arbor of that figure, two of the three helically curved jaws thereof being cut away.
Figure 4:
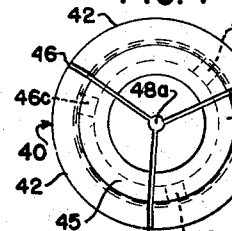
Figure 4 is a front end view of the arbor of Figure 2.

The slots 46b join and are continuous with a portion of the slots 46 designated 46c in Figures 2 and 3. The slots 46c, like the slots 46a, extend axially of the arbor and, because of the helical twist of the slots 46b, are at a peripheral angle to the slot portions 46a of substantially more than 120 degrees and less than 180 degrees.

It will be understood that the slots 46c are shown extending axially of the arbor for reasons of facility in manufacture and that they may be of the same width as slots 46b and may possibly be the innermost part of the last mentioned slots 46b.

The jaws 42 are joined to the end portion 41 of the arbor between the slots 46c, and the resilient connecting portions 43 of the jaws are cylindrically curved exteriorly like the end portion 41. The conical portions 44 of the jaws 42 are conically curved, their combined outer surfaces defining a frustum of a cone co-axial with the end portion 41 and sloping outward away therefrom. The outer surfaces of the work-gripping portions 45a and 45b each define a cylinder also co-axial with the end portion 41, the cylinders being successively of less diameter one from the other and from the major diameter of the conical frustum thus providing shoulders 47a and 47b shown in Figure 1 against which the work may be clamped.

A central axial hole 48 extends the length of the arbor, varying successively in diameter from end to end of the arbor and being intersected by each of the slots 46. The hole 48 is comparatively large at the rear end of the arbor, which portion of the hole is denoted 48c in the drawings, leaving the wall of the cylindrical end portion 41 and the resilient connecting portions 43 of the jaws 42 between the slots 46c comparatively thin. At the other end of the arbor, extending the length of the work-gripping portions 45a and 45b of the jaws 42, the hole 48 is comparatively small being denoted 48a and being little larger than the common intersection of the slots 46a. The intermediate portion of the hole 48, denoted 48b, which forms the common intersection of the slots 46b, is substantially larger than portion 48a and considerably smaller than the portion 48c, thus leaving the jaws 42 comparatively rigid at their forward ends and resilient at the portions between the slots 46c.

It will now be apparent that the compressive force exerted by the sleeve 37 of the spindle 36, as the nut 38 is tightened, upon the conical portions 44 of jaws 42 in the region of area A (Figure 3) will result in an expansive force of the area B against the work 39 which is thus internally chucked.

The preferred method of manufacturing the above described arbor is to start with a one-piece blank of alloy steel and machine it to its approximate dimensions before hardening, the work-gripping and spindle-engaging portions being formed oversize for a later, more exact grinding operation after hardening. The central axial hole 48 is conventionally bored before hardening and the slots 46a and 46c of the jaw-separating slots 46 are milled in conventional manner. The helically twisted slots 46b, however, are preferably flame-cut to give the jaws 42 the peculiar shape hereinafter described.

The particular improvement which is the subject of the present invention is the shaping of the helically twisted portions of the jaws 42 in the cutting of the slots 46b which permits a faster twist in the slots 46b without lessening the rigidity of the forward portions of the jaws 42.

The helical twist of the slots is said to be faster when the peripheral angle through which the slot is twisted occurs over an axial distance on the arbor which is comparatively shorter. Conversely, the twist is slow when the angle over which the slot moves takes place over a comparatively greater axial distance.

Inspection of the heretofore known arbor 35 of Figure 1 and comparison with the improved arbor 40 of Figure 2 shows this faster twist. The peripheral angle through which each slot is twisted is the same in both arbors. The axial distance in which this twist occurs, however, is substantially less in the improved arbor 40, with the result that the distance between the area A and area B in the arbor 40 is substantially less than the distance between the similar areas S and G in arbor 35.

The particular shaping of the helically twisted jaws 42 which gives rigidity to the jaws despite the faster twist, is obtained by cutting the slots 46b by a torch flame, or other cutting tool, directed from the outside of the arbor toward the center at an angle to the axis of the arbor which varies as the slots 46b are cut from their juncture with the slots 46a to their juncture with the slots 46c. The flame, or other cutting tool, is directed toward the outer end of the arbor, to the left in Figure 2, at an acute angle to the axis of the arbor at the start of the cut and this angle is increased as the cut is made until a 90-degree angle is reached at the point indicated at Y in Figure 2. As the cutting continues, the flame or other cutting tool is directed in the other direction, to the right in Figure 2, at a gradually decreasing angle to the axis of the arbor until the end of the cut is reached at the juncture of slots 46b with slots 46c.

Referring again to Figure 2, it will be apparent that, since the cutting flames are directed to the left at the start of cutting the helically twisted slots 46b, the twist of the slots will be faster at the outside of the arbor than at the center for this portion of the slots. As a result more metal will be left on the jaw 42 shown in Figure 3 at the area indicated at "X" than would have been the case if the direction of the flames had remained horizontal. Of course, less metal remains at the center of the arbor on the other side of the said jaw 42 in the direction indicated by the arrow "W" but it will be apparent that the strength of the arm at the latter indicated spot is less critical.

Since the slots 46b on either side of the jaw 42 shown in Figure 3 are cut in a similar manner, where less metal is left on one side of jaw 42, by reason of the tilting of the flame with respect to the axis of the arbor, more metal will be left on the other side. As the "corner" indicated at Y is turned, the torch flame has been turned to the right and more metal, therefore, has been cut away from the area indicated at "Z" in Figure 3. This results in a complementary build up of strength on the other side, not seen, of the jaw 42 near the center of the arbor.

It will be seen from inspection of Figure 3 that the area opposite area "Z" at the inside of the arbor on jaw 42 is immediately adjacent the area "X" and that this area is the critical area as regards the strength of the jaw 42 when the twist of slots 46b is "fast" as shown in Figure 2 as opposed to the "slow" twist of arbor 35 shown in Figure 1.

Since the flame of the cutting torch, or other tool, tilts, with respect to the axis of the arbor, from a direction toward the outer end of the arbor to a direction toward the inner end, as each slot 46b is cut, it will be apparent that the helical twisting of the slots 46b will start at a point axially farther out on the arbor blank and will have progressed farther when the cut is complete, at the center of the arbor than at the outside thereof due to the progressive tilting of the cutting means with respect to the axis of the arbor. Thus the rate of twist will be different on the outside than on the inside throughout this portion of the slots 46. When a flame cutting torch is used, the inner portion of the slots is exposed to the cutting flame for a shorter period of time than the outer portion, thus enabling an operator to move the flame along the cut with maximum speed and to keep the slots 46b as narrow as possible at the center of the arbor.

While there is herein described, and in the drawings shown, illustrative embodiments of the invention, it is to be understood that the invention is not limited thereto, but may comprehend other constructions, arrangement of parts, details and features without departing from the spirit of the invention. I desire to be limited, therefore, only by the scope of the appended claims.

I claim:

1. In an arbor for internally chucking a workpiece of the type having a body of metal with a peripherally continuous end portion and a plurality of jaw members integral with said end portion and extending axially therefrom, said jaw members being peripherally separated by a first group of axially extending slots extending from a place adjacent to said end portion, a second group of axially extending slots axially spaced from said first group, and a group of helically extending slots respectively connecting peripherally offset slots of said first and second groups, the improvement comprising each of said helically extending slots having a different helical twist at the outside and at the center of said arbor during at least a portion of its helical extent, whereby said jaw members are structurally strengthened.

2. An arbor as set forth in claim 1 in which said helically extending slots have a faster helical twist at the outside of said arbor than at the center thereof through that portion of said helically extending slots adjacent said second group of axially extending slots.

3. An arbor as set forth in claim 1 in which each of said helically extending slots has a different rate of twist at the center of said arbor from the rate of twist at the outside thereof throughout a portion of its length.

References Cited in the file of this patent

UNITED STATES PATENTS

| 2,280,151 | Hughey et al. | Apr. 21, 1942 |
| 2,296,376 | Babcock et al. | Sept. 22, 1942 |
| 2,561,603 | Woerner | July 24, 1951 |
| 2,593,638 | Westberg | Apr. 22, 1952 |
| 2,602,672 | Wiard | July 8, 1952 |
| 2,680,607 | Hollinger | June 8, 1954 |

FOREIGN PATENTS

| 139,195 | Sweden | Feb. 17, 1953 |